(12) United States Patent
Sivashanmugam et al.

(10) Patent No.: US 11,488,249 B1
(45) Date of Patent: Nov. 1, 2022

(54) COMMUNICATION SYSTEM

(71) Applicant: Nationwide Mutual Insurance Company, Columbus, OH (US)

(72) Inventors: Prabaharan Sivashanmugam, Powell, OH (US); Sreenidhi R. Allipuram, Dublin, OH (US); David A. Vasquez, Powell, OH (US); Venkateswara R. Menta, Hilliard, OH (US); Vernon Eudell, II, Dublin, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 425 days.

(21) Appl. No.: 15/949,224

(22) Filed: Apr. 10, 2018

Related U.S. Application Data

(60) Provisional application No. 62/483,984, filed on Apr. 11, 2017.

(51) Int. Cl.
 *G06Q 40/08* (2012.01)
 *G06Q 20/38* (2012.01)

(52) U.S. Cl.
 CPC ............ *G06Q 40/08* (2013.01); *G06Q 20/38* (2013.01)

(58) Field of Classification Search
 CPC ..... H04L 67/36; H04L 63/0807; G06F 16/93; G06Q 40/08; G06Q 20/38
 (Continued)

(56) References Cited

U.S. PATENT DOCUMENTS

| 8,713,106 B2 * | 4/2014 | Spataro | G06F 16/93 709/205 |
| 8,719,063 B1 * | 5/2014 | Wade | G06Q 40/08 705/4 |

(Continued)

OTHER PUBLICATIONS

Dialog NPL (non-patent literature) Search, dated Mar. 18, 2022. (Year: 2022).*

*Primary Examiner* — Hai Tran
(74) *Attorney, Agent, or Firm* — Morgan, Lewis & Bockius LLP

(57) ABSTRACT

A system for allowing improved communication between parties. The system includes a consumer data module that is configured to receive data describing a consumer. The consumer data includes data input by the consumer and/or data obtained from third party sources. A financial services professional data module receives data describing a financial services professional. The financial services professional data includes data input by the financial services professional and/or data obtained from third party sources. Databases are configured to store the consumer data and the financial services professional data. A communication module is configured to receive a request from a consumer to engage a financial services professional. A consumer finances module is configured to access financial information of the consumer upon obtaining authorization by the consumer. A matching engine is configured to identify one or more financial services professionals to present to the consumer based on the consumer data, the financial services profession data, and the financial information of the consumer. An engagement module is configured to receive from the consumer a selection of financial services professionals and transmit to the selected financial services professional an indication of the selection.

20 Claims, 3 Drawing Sheets

(58) Field of Classification Search
USPC .............................................................. 705/4
See application file for complete search history.

(56) References Cited

U.S. PATENT DOCUMENTS

| | | | | |
|---|---|---|---|---|
| 8,799,124 | B1* | 8/2014 | Daken | G06Q 40/00 |
| | | | | 705/35 |
| 9,990,608 | B2* | 6/2018 | Phillips | G06Q 10/103 |
| 10,268,995 | B1* | 4/2019 | Zimmerman | G06Q 40/08 |
| 2015/0178742 | A1* | 6/2015 | Smith | H04L 67/36 |
| | | | | 705/7.29 |
| 2016/0028715 | A1* | 1/2016 | Sivashanmugam | G06Q 20/401 |
| | | | | 726/7 |
| 2017/0070500 | A1* | 3/2017 | Hockey | H04L 63/0807 |
| 2018/0060981 | A1* | 3/2018 | Sher | G06Q 50/163 |

* cited by examiner

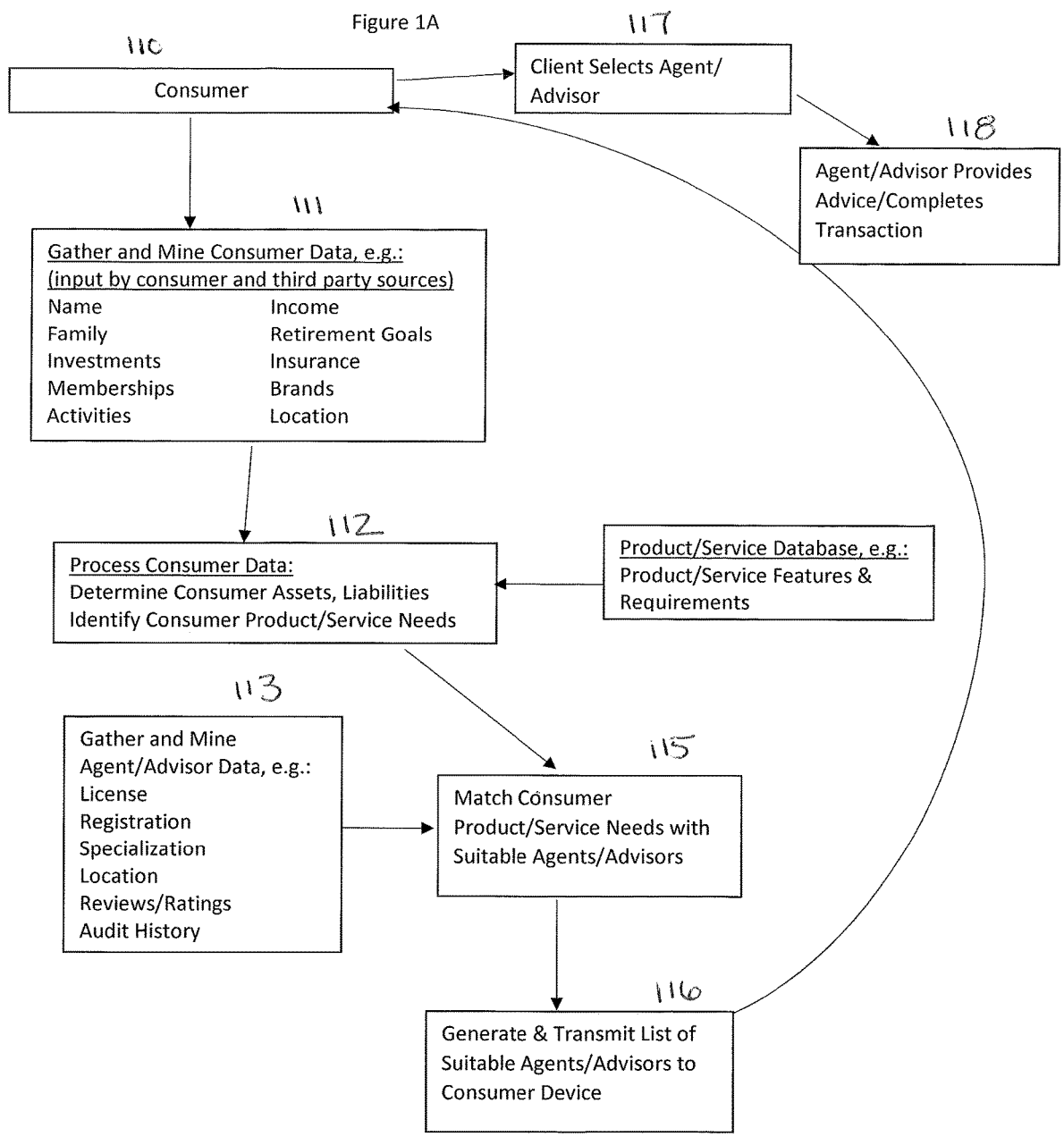

COMMUNICATION SYSTEM

CROSS REFERENCE TO RELATED APPLICATIONS

This application claims priority to U.S. Provisional Patent Application No. 62/483,984, filed Apr. 11, 2017, which is incorporated herein by reference in its entirety.

FIELD OF THE INVENTION

The invention relates to an improved system to facilitate communications between parties.

BRIEF SUMMARY OF THE INVENTION

The invention is directed to a system for allowing improved communication between parties. The system includes a consumer data module that is configured to receive data describing a consumer. The consumer data includes data input by the consumer and/or data obtained from third party sources. A financial services professional data module receives data describing a financial services professional. The financial services professional data includes data input by the financial services professional and/or data obtained from third party sources. Databases are configured to store the consumer data and the financial services professional data. A communication module is configured to receive a request from a consumer to engage a financial services professional. A consumer finances module is configured to access financial information of the consumer upon obtaining authorization by the consumer. A matching engine is configured to identify one or more financial services professionals to present to the consumer based on the consumer data, the financial services profession data, and the financial information of the consumer. An engagement module is configured to receive from the consumer a selection of financial services professionals and transmit to the selected financial services professional an indication of the selection.

In some embodiments, the matching engine is configured to identify the financial services professional based further on a geolocation of the consumer.

In other embodiments, the engagement module is further configured to receive from the consumer authorization to share at least certain of the financial information with the selected financial services professional and to provide the selected financial services professional with access to the financial information.

In certain embodiments, the system also includes a payment module configured to receive payment information from the consumer in compensation for advice rendered by the selected financial services professional and effectuate payment to the selected financial services professional.

In some embodiments, upon the payment module effectuating payment to the selected financial services professional, access by the selected financial services professional to the financial information of the consumer is prevented.

In some embodiments, the engagement module is further configured to receive data describing an acceptance by the consumer of the advice and indication of implementation of the advice.

In certain embodiments, the system includes a collaboration module configured to facilitate collaboration among the consumer and other consumers using the system.

In other embodiments, the system further includes a data transfer module configured to facilitate the consumer financial data transfer to the financial advisor or agent. In certain of these embodiments, upon completion of the data transfer, the data is maintained in the financial advisor or agent device only for a predetermined time.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIG. 1A is a flow diagram of an exemplary method of the present invention;

DETAILED DESCRIPTION OF EMBODIMENTS OF THE INVENTION

The present invention involves systems and methods that enable a direct connection between an individual or commercial consumer with insurance agents and/or registered investment advisors (MA) or other financial advisors and insurance and financial service providers. In the future, consumers in these industries may begin to look for a one stop shop for all their insurance and/or financial planning and services for a predetermined fee; to look for an easy and near real-time method to connect with a suitable and reputable agent and/or financial advisor for their insurance and financial planning; and/or to determine an agent or advisor's reputation through their social media acquaintances' referrals, references, and opinions.

Through this system and process, insurance carriers and/or financial service providers will be able to: (i) identify customers, (ii) consolidate all consumer financial data, (iii) consolidate all agents and advisors in industry, (iv) provide a list of suitable agents and/or financial advisors available in the given proximity that meets consumer preferences, (v) provide a method for the consumer to select an agent or advisor, a mode of engagement and schedule a time to meet, (vi) access the information through multiple channels like phone, chat bots, voice assistants, and virtual personal assistants, and (vii) connect the consumer with the agent or advisor to complete a transaction. Individuals may benefit through this system by finding a most preferred advisor from a pool of suitable/qualified advisors for a predetermined flat fee and connecting with the preferred advisor through one of the preferred engagement models (for example, Skype, in-person, or phone call).

Figure 1B:
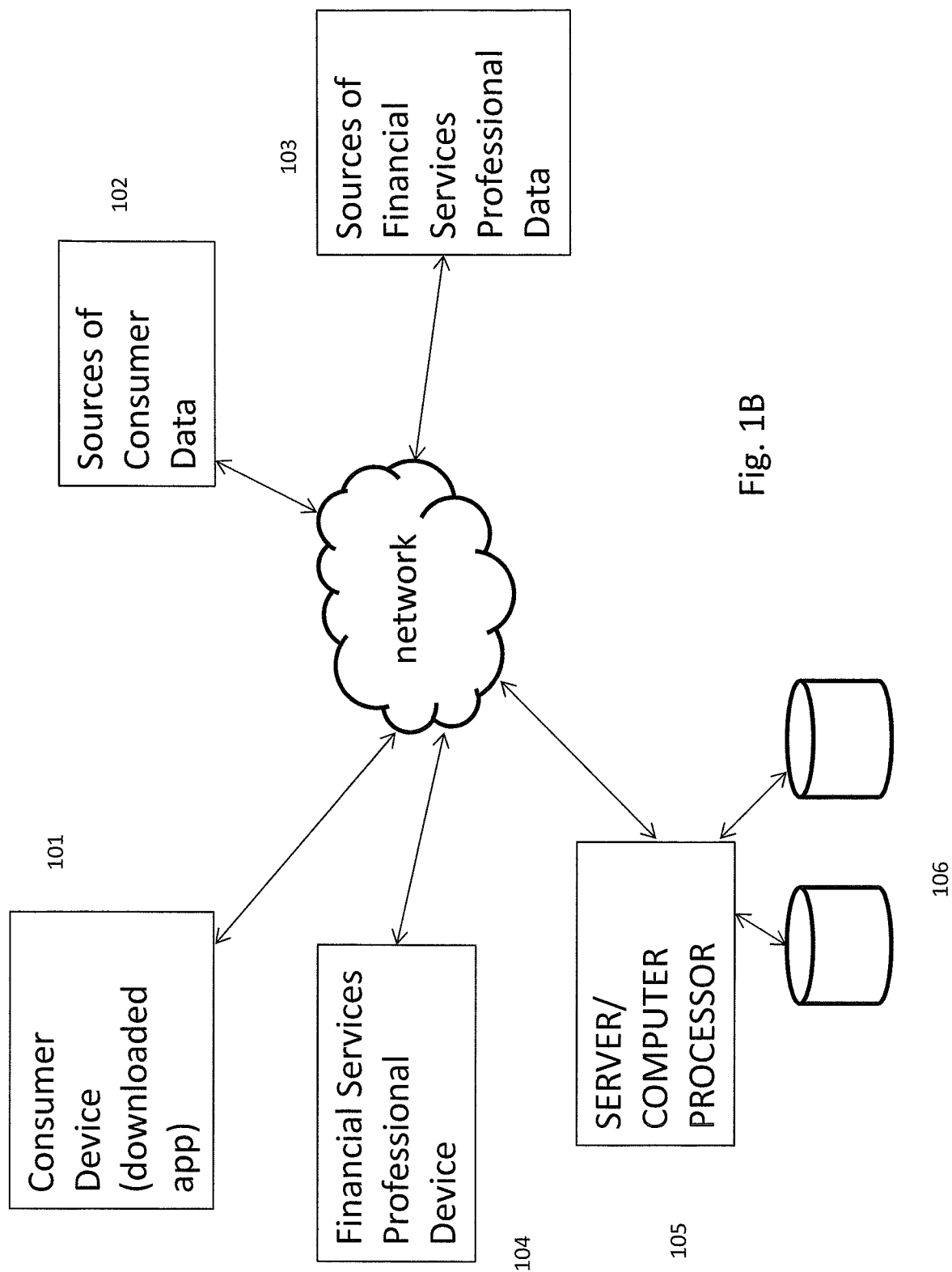
FIG. 1B is a diagram of an exemplary system of the present invention.

With reference to FIG. 1A, in step 110, the consumer commences the process. In step 111, data describing the consumer is gathered and mined (e.g., from third party sources and input by the consumer himself). In step 112, the consumer data is processed (e.g., the consumer's assets and liabilities are determined, as well as the consumer's product/service needs). In step 113, data regarding the financial service professional is gathered and mined. In step 115, using the data gathered/mined in step 112 and step 113, the consumer's product/service needs are matched with a suitable agent/advisor. In step 116, a list of suitable agents/advisors is generated and transmitted to a device of the consumer. In step 117, the consumer selects an agent/ advisor. In step 118, the agent/advisor provides advice to the consumer, and the transaction is completed.

Embodiments of the present invention facilitate an individual's identification of and meeting with a financial advisor. In one embodiment, with reference to FIG. 1B, the system 105 uses data mining and analytics to gather information on individual or commercial consumers, who may be identified along various market segments. For example, the system may search and analyze consumer information (sources of consumer data 102) relating to their usage of social media, brand outlets, shopping trends or preferences, travel, financial or personal goals and maintains this information in database(s) 106. The system 105 also creates and maintains a repository(ies) or database(s) 106 of agent and/or financial advisor information. This information may be gathered through a variety of third party/publicly available sources 103, such as government registries (e.g., FINRA), firm or individual websites and bios, social media, etc. The system 105 may provide for consumer use, as described in greater detail below, a consolidated view of all agents and/or advisors (financial planner/producer) available in the industry that includes agent/advisor profiles, preferences, certifications, licenses, registrations, sales history.

The system 105 may generate and transmit a communication to an identified consumer through consumer device 101 encouraging them to consult with an insurance agent or financial advisor and requesting authorization to access the consumer's personal and financial data. With access to and analysis of this data, the system determines the consumer's assets, liabilities, and potential insurance and/or financial product or service needs. The system 105 may also take into evaluation any preferences specific to the consumer that have been identified through the consumer's data or provided by the consumer (e.g. another source of consumer data 102) and maintained in database(s) 106. The system 105 may process its consumer-specific determinations and consumer data with the stored agent/advisor data (all of which being stored in database(s) 106) to determine those agents/advisors satisfying suitability criteria for a respective consumer and generate a proposed list of the same for the consumer's selection for a meeting, discussion, and/or potential transaction.

In one embodiment, the system 105 supports an application through which a consumer interacts with the system by downloading the application to their desktop or mobile device 101, and grants authorization to gather personal and financial information of consumer (e.g., age, income, employment, assets, liabilities, children, disabilities). Once information is available through the application, the consumer can select which information he is agreeable to sharing with certain advisor(s) for consultation and financial advice.

The consumer can input into system 105 a specific needs-based question for which he is seeking financial advice, without necessarily having to engage in a comprehensive relationship with the advisor. This enables a one-off, one-time fee for advice. Upon input of the question, the system searches its database 106(s) of agents and/or advisors, who have been identified and captured by the system or who have registered with application (e.g., financial services professional device 104 can be used by such agents/advisors to use the application and/or otherwise communicate with system 105) to make their services available via the application for licenses and/or specialization in advising on the inputted question, and presents a results list of qualifying advisors to the consumer. Advisors who registered with the application set up a profile containing their location, contact information, employer/brokerage company, licenses, specializations, expertise, languages, dollar amounts they are willing to accept for provision of various services via the application, and authorize the application to access their professional calendars. The application can regularly mine data to confirm accuracy of profiles and notify advisors of identified discrepancies, with the capability to disable profiles and advisor accessibility where certain discrepancies are found or go uncorrected.

The application may determine the consumer's geo-location (e.g., using consumer device 101) and limit its listing of advisors to those in the same vicinity if consumer indicates he is interested in a face-to-face meeting with advisor. The application also could offer various filters for consumer to further restrict the advisor search (e.g., using information in the advisor profiles; availability for specific time/location for consultation; advisor ratings (based on other app-consumer feedback with experience with relevant advisor)). The consumer selects the advisor. The application notifies selected advisor of the request for services and the consumer's inputted question and option to provide or decline services. With the advisor's acceptance of the request, the application informs the consumer. If the advisor declines, the consumer may select an alternative advisor from the generated list. The consumer then designates the personal and financial information he wishes to share with advisor, which the application consolidates and transmits to the advisor.

The application can, in view of consumer's and advisor's calendars, schedule time and location (e.g., in person, chat, telephone) for consultation. At the conclusion of the consultation, the advisor offers recommendations (and could also deliver them through the application to consumer), and the application completes the payment transaction. Alternatively, the advisor reviews the shared information in view of the consumer's inputted question/requested advice and responds via the application to the consumer with the advisor's advice or recommendations and offer of additional services in carrying out that advice, if appropriate. In conjunction with the advisor's transmission of advice to consumer, the application delivers payment of the agreed upon sum to advisor with bill to consumer (e.g., through use of PayPal, Klarna, credit card, prepaid account), or application delivers payment to advisor, less commission to application provider. The application also could be configured to delete the consumer's personal and financial information from advisor's application account upon the advisor's transmission of advice (or could be set up as an option for consumer to select upon receipt of advisor's advice), but application could retain records of all shared information and advice given that can be later accessed upon proper authorization if needed for legal/regulatory purposes.

The consumer, if satisfied with the advice, can select option for the advisor to take the recommended action. This could be tied to an additional fee or could arrange for further consultation with advisor for discussion on taking the recommended action. The consumer can also rate his experience with the advisor through the application, enhancing other consumers' use of the application and search for advisors available by fixed fee service/consultation. Further, for example, the system may allow consumers to collaborate by providing one or more collaboration channels and/or an omni-channel (seamlessly switch between channels) experience through which they share feedback and input on their experiences with the subject agents and advisors. These communication messages could be integrated across all channels and enable the delivery and receipt of mutual feedback.

Figure 2:
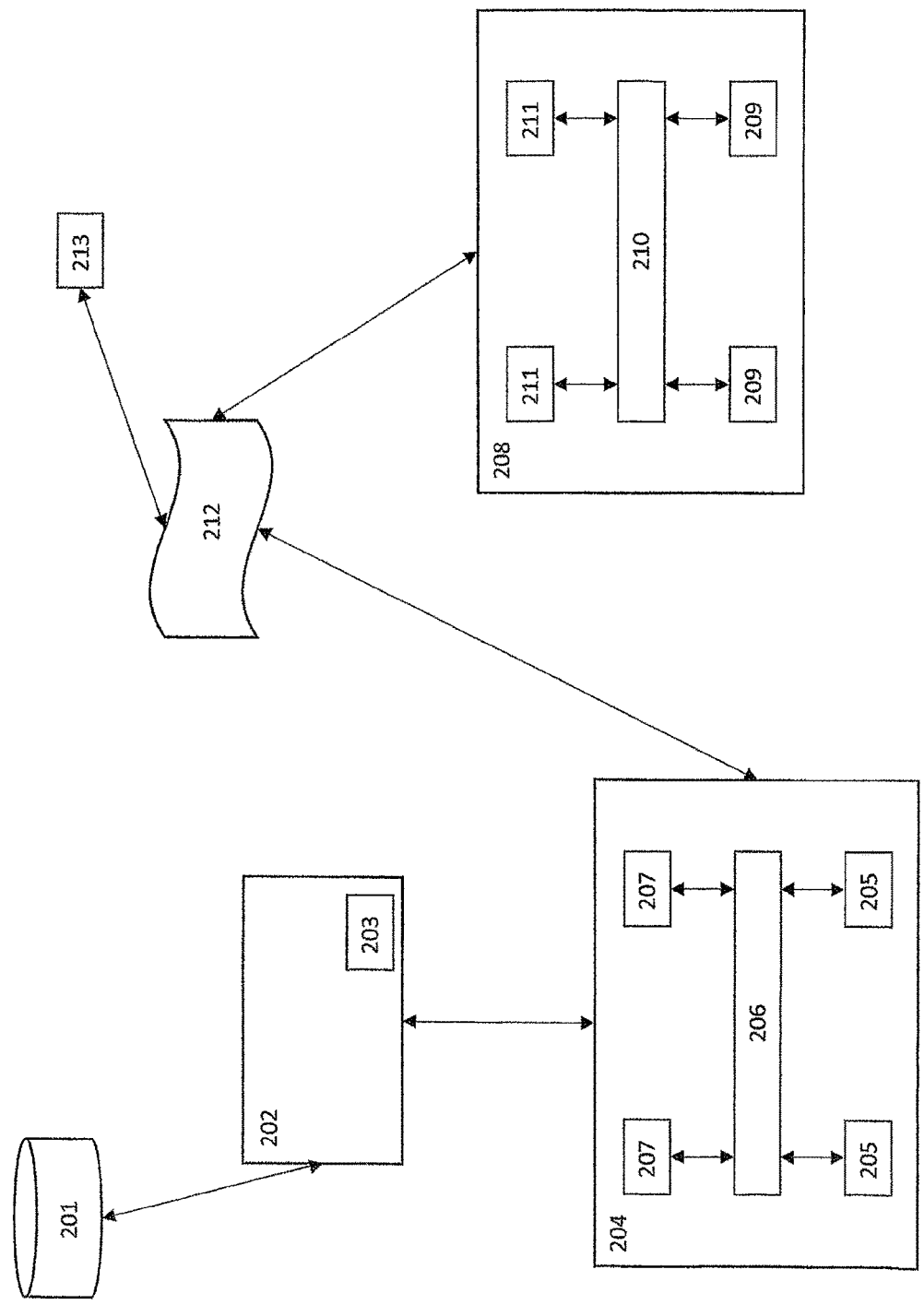
FIG. 2 is an exemplary computer architecture of the present invention.

In some embodiments, the methods are carried out by a system that employs a client/server architecture such as, for example, the exemplary embodiments described as follows with reference to FIG. 2. The data that may be used as an input to each of the system(s), and the outputs from the system(s), may be stored in one or more databases 201. Database server(s) 202 may include a database services management application 203 that manages storage and retrieval of data from the database(s) 201. The databases 201 may be relational databases; however, other data organizational structures may be used without departing from the scope of the present invention.

One or more application server(s) 204 are in communication with the database server 202. The application server 204 communicates requests for data to the database server 202. The database server 202 retrieves the requested data. The application server 204 may also send data to the database server 202 for storage in the database(s) 201. The application server 204 comprises one or more processors 205, non-transitory computer readable storage media 207 that store programs (computer readable instructions) for execution by the processor(s), and an interface 206 between the processor(s) 205 and computer readable storage media 207. The application server 204 may store the computer programs and code used to implement the method of the present invention, including the various modules described and claimed herein (e.g., The consumer data module; the financial services professional data module; the communication module; the consumer finances module; the matching engine; the engagement module; the payment module; the collaboration module; and the data transfer module).

To the extent data and information is communicated over a network (e.g., the Internet or an Intranet), one or more network servers 208 may be employed. The network server 208 also comprises one or more processors 209, computer readable storage media 211 that store programs (computer readable instructions) for execution by the processor(s), and an interface 210 between the processor(s) 209 and computer readable storage media 211. The network server 208 is employed to deliver content that can be accessed through the communications network 212, e.g., by an end user employing computing device 213. When data is requested through an application, such as an Internet browser, the network server 208 receives and processes the request. The network server 208 sends the data or application requested along with user interface instructions for displaying an interface on device 213, such as a point of sale terminal.

The computers referenced herein are specially programmed to perform the functionality described herein.

The non-transitory computer readable storage media (e.g., 207 or 211) that store the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A system for protecting access to consumer information, the system comprising:
   one or more networks servers configured to deliver an application and instructions for displaying, on a user device interface, the application, the application configured to regularly mine data through third party sources and configured to allow a consumer and a financial services professional to enter data, wherein the application receives an authorization from the consumer to access consumer data associated with the consumer;
   a consumer data module coupled to the one or more network servers and configured to receive, via the application, the consumer data associated with the consumer, the consumer data comprising personal information and financial information that includes both data obtained by the application through third party sources and data received by the user device interface;
   a financial services professional data module coupled to the one or more network servers and configured to receive financial services data associated with at least one financial services professional, the financial services data comprising both data obtained by the application through third party sources and data received by a financial services professional interface, the financial services professional data module further configured to compare the data input by the at least one financial services professional and data obtained from the third party sources to generate an inconsistency indication;
   one or more databases coupled to the one or more network servers, the consumer data module, and the financial services professional data module, the one or more databases configured to store the consumer data and the financial services data;

a communication module coupled to the one or more network servers and configured to receive from the consumer data module a request from the consumer to engage the at least one financial services professional;

a consumer finances module coupled to the one or more network servers and configured to receive a selection by the consumer of the consumer data to be transmitted to the at least one financial services professional and accessing, from the one or more databases, the selection of the consumer data from the consumer upon obtaining the request and the authorization from the consumer;

a matching engine coupled to the one or more network servers and configured to receive, from the consumer finances module, the selection of the consumer data and identify one or more financial services professionals to present to the consumer, on the application on the electronic device, based on the financial services data and the selection of the personal information and the financial information of the consumer; and an engagement module coupled to the one or more network servers and configured to receive, from the application, a selection of the one or more financial services professionals and providing access to the selected financial services professional the selection of the one or more financial services professionals and the selection of the consumer data, wherein the engagement module consolidates and transmits the selected consumer data to the selected one or more financial services professionals, wherein the application receives the inconsistency indication from the financial services professional data module, provides to the selected financial services professional, via the engagement module, rectification instructions to correct an inconsistency associated with the inconsistency indication, and instructs the engagement module to terminate access of the selected financial services professional to the selection of personal information of the consumer and the financial information of the consumer based on the rectification instructions being unfulfilled.

2. The system of claim 1 wherein the matching engine is configured to identify the one or more financial services professionals based on a geolocation of the consumer.

3. The system of claim 1 wherein the engagement module receives from the consumer an authorization to share at least certain of the financial information with the selected financial services professional and wherein the engagement module provides the selected financial services professional with access to the at least certain financial information of the financial information.

4. The system of claim 1 further comprising:
a payment module receiving payment information from the consumer via the application on the electronic device in compensation for advice rendered by the selected financial services professional and effectuate payment to the selected financial services professional.

5. The system of claim 4 wherein, upon the payment module effectuating payment to the selected financial services professional, preventing access by the selected financial services professional to the at least certain of the financial information.

6. The system of claim 4 wherein the engagement module receives data describing an acceptance by the consumer of the advice and indication of implementation of the advice, wherein upon implementation of the advice, the engagement module automatically disables the access of the selected financial services professional to the selection of the personal information and the financial information of the consumer.

7. The system of claim 1 further comprising:
a collaboration module facilitating collaboration among the consumer and other consumers using the system.

8. The system of claim 1 further comprising: a data transfer module facilitating a consumer financial data transfer to a financial advisor or agent.

9. The system of claim 8 further comprising: upon completion of the data transfer, the data is maintained in a device associated with the financial advisor or agent only for a predetermined time.

10. The system of claim 1 wherein the third party sources include one or more of government registries, publicly accessible databases, social media account, and individual websites.

11. The system of claim 1 wherein the one or more network servers mediate data between the application and one or more of the consumer data module, the financial services professional module, the communication module, the consumer finances module, the matching engine, and the engagement module.

12. A computer-implemented method for protecting access to consumer information, the method comprising:
delivering, via one or more network servers, an application and instructions for displaying, on a user device interface, the application, the application configured to regularly mine data through third party sources and configured to allow a consumer and a financial services professional to enter data, wherein the application receives an authorization from the consumer to access consumer date associated with the consumer;

receiving, using a consumer data module coupled to the one or more network servers, the consumer data associated with the consumer, the consumer data comprising personal information and financial information that includes both data obtained by the application through third party sources and data received by the user device interface receiving financial services data associated with at least one financial services professional at a financial services professional data module coupled to the one or more network servers, the financial services data comprising both data obtained by the application through third party sources and data received by a financial services professional interface, the financial services professional data module further configured to compare the data input by the at least one financial services professional and data obtained from the third party sources to generate an inconsistency indication;

storing the consumer data and the financial services data in one or more databases coupled to the one or more network servers, the consumer data module, and the financial services professional data module;

receiving, from the consumer data module, a request from the consumer to engage a financial services professional at a communication module;

accessing, from the one or more databases, the consumer data upon obtaining the request and an authorization from the consumer using a consumer finances module coupled to one or more network servers;

receiving, using a matching engine coupled to one or more network servers, from the consumer finances module, the selection of the consumer data and identifying, using the processor, one or more financial services professionals to present to the consumer, on the application of the electronic device, based on the financial services data and the selection of the personal information and the financial information of the consumer;

receiving, from the application, a selection of the one or more financial services professionals and providing access to the selected financial services professional the selection of the one or more financial services professionals and the selection of the consumer data using an engagement module, wherein the engagement module consolidates and transmits the selected consumer data to the selected one or more financial services professionals;

receiving, via the application, the inconsistency indication from the financial services professional data module;

providing to the selected financial services professional, via the engagement module, rectification instructions to correct an inconsistency associated with the inconsistency indication; and instructing the engagement module to terminate access of the selected financial services professional to the selection of personal information of the consumer and the financial information of the consumer based on the rectification instructions being unfulfilled.

13. The method of claim 12 further comprising:

identifying the one or more financial services professionals based on a geolocation of the consumer using the matching engine.

14. The method of claim 12 further comprising:

receiving from the consumer, by the engagement module, an authorization to share at least certain of the financial information with the selected financial services professional; and providing, by the engagement module, the selected financial services professional with access to the at least certain financial information of the financial information.

15. The method of claim 12 further comprising:

receiving payment information from the consumer via the application on the electronic device, by a payment module, in compensation for advice rendered by the selected financial services professional; and effectuating payment to the selected financial services professional.

16. The method of claim 15 further comprising:

preventing access by the selected financial services professional to the at least certain of the financial information upon the payment module effectuating payment to the selected financial services professional.

17. The method of claim 15 further comprising:

receiving, by the engagement module, data describing an acceptance by the consumer of the advice and indication of implementation of the advice, wherein upon implementation of the advice, the engagement module automatically disables the access of the selected financial services professional to the selection of the personal information and the financial information of the consumer.

18. The method of claim 12 further comprising:

facilitating collaboration among the consumer and other consumers using a collaboration module.

19. The method of claim 12 further comprising:

facilitating a consumer financial data transfer to a financial advisor or agent by a data transfer module.

20. The method of claim 19 wherein, upon completion of the data transfer, the data is maintained in a device associated with the financial advisor or agent only for a predetermined time.

\* \* \* \* \*